(12) United States Patent
Park et al.

(10) Patent No.: US 9,511,740 B2
(45) Date of Patent: *Dec. 6, 2016

(54) AIR BAG CUSHION DEVICE FOR PROTECTING PEDESTRIAN

(71) Applicant: Hyundai Mobis Co., Ltd., Seoul (KR)

(72) Inventors: Hae Kwon Park, Yongin-si (KR); Seok Min Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/722,920

(22) Filed: May 27, 2015

(65) Prior Publication Data

US 2016/0059822 A1   Mar. 3, 2016

(30) Foreign Application Priority Data

Aug. 29, 2014 (KR) .................... 10-2014-0113934

(51) Int. Cl.
 *B60R 21/36* (2011.01)
 *B60R 21/2338* (2011.01)
 *B60R 21/00* (2006.01)
 *B60R 21/34* (2011.01)

(52) U.S. Cl.
 CPC ........... *B60R 21/36* (2013.01); *B60R 21/2338* (2013.01); *B60R 2021/0004* (2013.01); *B60R 2021/346* (2013.01)

(58) Field of Classification Search
 CPC .. B60R 21/231; B60R 21/233; B60R 21/2334; B60R 21/2338; B60R 21/2346; B60R 21/261; B60R 21/36; B60R 2021/161; B60R 2021/23308; B60R 2021/23316; B60R 2021/23324; B60R 2021/23382; B60R 2021/346
 See application file for complete search history.

(56) References Cited

U.S. PATENT DOCUMENTS

| 6,340,174 | B1 * | 1/2002 | Takagi | B60R 21/2346 280/736 |
| 6,467,563 | B1 * | 10/2002 | Ryan | B60R 21/36 180/274 |
| 6,497,302 | B2 * | 12/2002 | Ryan | B60R 21/36 180/271 |

(Continued)

FOREIGN PATENT DOCUMENTS

| DE | 10059223 A1 * | 7/2002 | ............ B60R 21/36 |
| DE | 102011114297 A1 * | 3/2013 | ............ B60R 21/36 |

(Continued)

*Primary Examiner* — Laura Freedman
(74) *Attorney, Agent, or Firm* — H.C. Park & Associates, PLC

(57) ABSTRACT

An air bag cushion device for protecting a pedestrian including: an inflator mounted on a vehicle body and generating working gas; a main chamber receiving the working gas generated from the inflator and expanding in a widthwise direction of the vehicle body; a sub-chamber connected to the main chamber, receiving the working gas through the main chamber, and expanding to the outside of an A-pillar of the vehicle body; and a connection path having both sides connected to the main chamber and the sub-chamber, respectively, so as to transfer the working gas between the chambers.

15 Claims, 15 Drawing Sheets

(56) References Cited

U.S. PATENT DOCUMENTS

| | | | | |
|---|---|---|---|---|
| 6,712,169 | B2 * | 3/2004 | Ryan | B60R 21/36 180/274 |
| 6,827,171 | B2 * | 12/2004 | Igawa | B60R 21/36 180/274 |
| 6,923,286 | B2 * | 8/2005 | Sato | B62D 25/081 180/274 |
| 6,955,238 | B2 * | 10/2005 | Takimoto | B60R 21/2338 180/274 |
| 7,287,618 | B2 * | 10/2007 | Okamoto | B60R 21/36 180/274 |
| 7,584,988 | B2 * | 9/2009 | Okamoto | B60R 21/36 180/274 |
| 7,828,319 | B2 * | 11/2010 | Takimoto | B60R 21/36 180/274 |
| 7,845,454 | B2 * | 12/2010 | Takimoto | B60R 21/2338 180/274 |
| 7,997,614 | B2 * | 8/2011 | Ishikawa | B60R 21/2338 112/285 |
| 8,016,066 | B1 * | 9/2011 | Boxey | B60R 21/36 180/271 |
| 8,327,968 | B2 * | 12/2012 | Hayashi | B60R 21/36 180/274 |
| 8,955,634 | B2 * | 2/2015 | Bergenheim | B60R 21/36 180/274 |
| 8,985,257 | B2 * | 3/2015 | Tanaka | B60R 21/237 180/274 |
| 9,073,513 | B2 * | 7/2015 | Kalliske | B60R 21/36 |
| 9,102,306 | B2 * | 8/2015 | Kitte | B60R 21/36 |
| 9,126,566 | B2 * | 9/2015 | Jeong | B60R 21/36 |
| 9,132,799 | B1 * | 9/2015 | Choi | B60R 21/36 |
| 9,174,605 | B2 * | 11/2015 | Choi | B60R 21/36 |
| 2006/0151228 | A1 * | 7/2006 | Kalliske | B60R 21/2338 180/274 |
| 2006/0201731 | A1 * | 9/2006 | Nakamura | B60R 21/36 180/274 |
| 2007/0023223 | A1 * | 2/2007 | Okamoto | B32B 17/10036 180/274 |
| 2010/0300792 | A1 * | 12/2010 | Yuan | B60R 21/26 180/274 |
| 2013/0133971 | A1 * | 5/2013 | Rick | B60R 21/36 180/274 |
| 2014/0291054 | A1 * | 10/2014 | Tanaka | B60R 21/36 180/274 |
| 2014/0318881 | A1 * | 10/2014 | Sugimoto | B60R 21/237 180/274 |
| 2015/0175122 | A1 * | 6/2015 | Ivenz | B60R 21/36 180/274 |
| 2016/0023629 | A1 * | 1/2016 | Park | B60R 21/36 180/274 |

FOREIGN PATENT DOCUMENTS

| | | | | |
|---|---|---|---|---|
| DE | 102012222006 A1 | * | 8/2013 | B60R 21/36 |
| DE | WO 2013131954 A1 | * | 9/2013 | B60R 21/233 |
| JP | DE 102005041274 | * | 3/2006 | B60R 21/36 |
| JP | EP 1992526 A2 | * | 11/2008 | B60R 21/231 |
| JP | 4441444 | | 1/2010 | |
| JP | 4517873 | | 5/2010 | |
| JP | 4570078 | | 8/2010 | |
| JP | 4621119 | | 11/2010 | |
| KR | 10-2007-0062221 | | 6/2007 | |
| KR | 10-2014-0014803 | | 2/2014 | |
| SE | EP 2492156 A1 | * | 8/2012 | B60R 21/36 |
| SE | EP 2502794 A1 | * | 9/2012 | B60R 21/36 |
| SE | EP 2524843 A1 | * | 11/2012 | B60R 21/36 |
| SE | EP 2548772 A1 | * | 1/2013 | B60R 21/36 |
| SE | EP 2607183 A1 | * | 6/2013 | B60R 21/36 |
| SE | WO 2014122108 A1 | * | 8/2014 | B60R 21/233 |
| SE | WO 2014129942 A1 | * | 8/2014 | B60R 21/36 |

* cited by examiner

AIR BAG CUSHION DEVICE FOR PROTECTING PEDESTRIAN

CROSS-REFERENCES TO RELATED APPLICATION

The present application claims priority from and the benefit of Korean Patent Application number 10-2014-0113934, filed on Aug. 29, 2014, which is incorporated by reference for all purposes as if fully set forth herein.

BACKGROUND

Field

Exemplary embodiments of the present invention relate to an air bag cushion device for protecting a pedestrian and, more particularly, to an air bag cushion device for protecting a pedestrian, which is capable of reducing the likelihood and/or severity of injury to a pedestrian by stably spreading an air bag.

Discussion of the Background

In general, an engine compartment is arranged at the front of a vehicle and includes an engine and a radiator arranged therein, and a hood for opening/closing the engine compartment is arranged at the top of the engine compartment. The rear side of the hood is coupled to the vehicle body by a hinge, and the hood is opened and closed while the front side thereof is moved upward and downward.

When a vehicle collides with a pedestrian, the pedestrian may fall onto the hood of the vehicle. In this case, the pedestrian may bump his/her head against a windshield glass or front pillar, thereby having a secondary injury. Recently, a variety of devices have been developed to reduce the likelihood/severity of a secondary injury to a pedestrian. The devices spread an air bag cushion between a vehicle and a pedestrian when the vehicle collides with the pedestrian, and thus, may prevent a secondary injury to the pedestrian, which may occur when the pedestrian bumps his/her head or the like against the vehicle. However, the devices have a problem in that the air bag may not be properly spread.

Korean Patent Laid-open Publication No. 2007-0062221, published on Jun. 15, 2007 and entitled "Bumper Air Bag Structure", discloses an example of such related art devices.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide an air bag cushion device for protecting a pedestrian capable of reducing the injury of a pedestrian by stably spreading an air bag.

Additional aspects will be set forth in the detailed description which follows, and, in part, will be apparent from the disclosure, or may be learned by practice of the inventive concept.

According to exemplary embodiments, an air bag cushion device for protecting a pedestrian may include: an inflator mounted on a vehicle body and that generates a working gas; a main chamber receiving the working gas generated from the inflator and expanding in a widthwise direction of the vehicle body; a sub-chamber connected to the main chamber, receiving the working gas through the main chamber, and expanding to the outside of an A-pillar of the vehicle body; and a connection path having both sides connected to the main chamber and the sub-chamber, respectively, so as to transfer the working gas.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
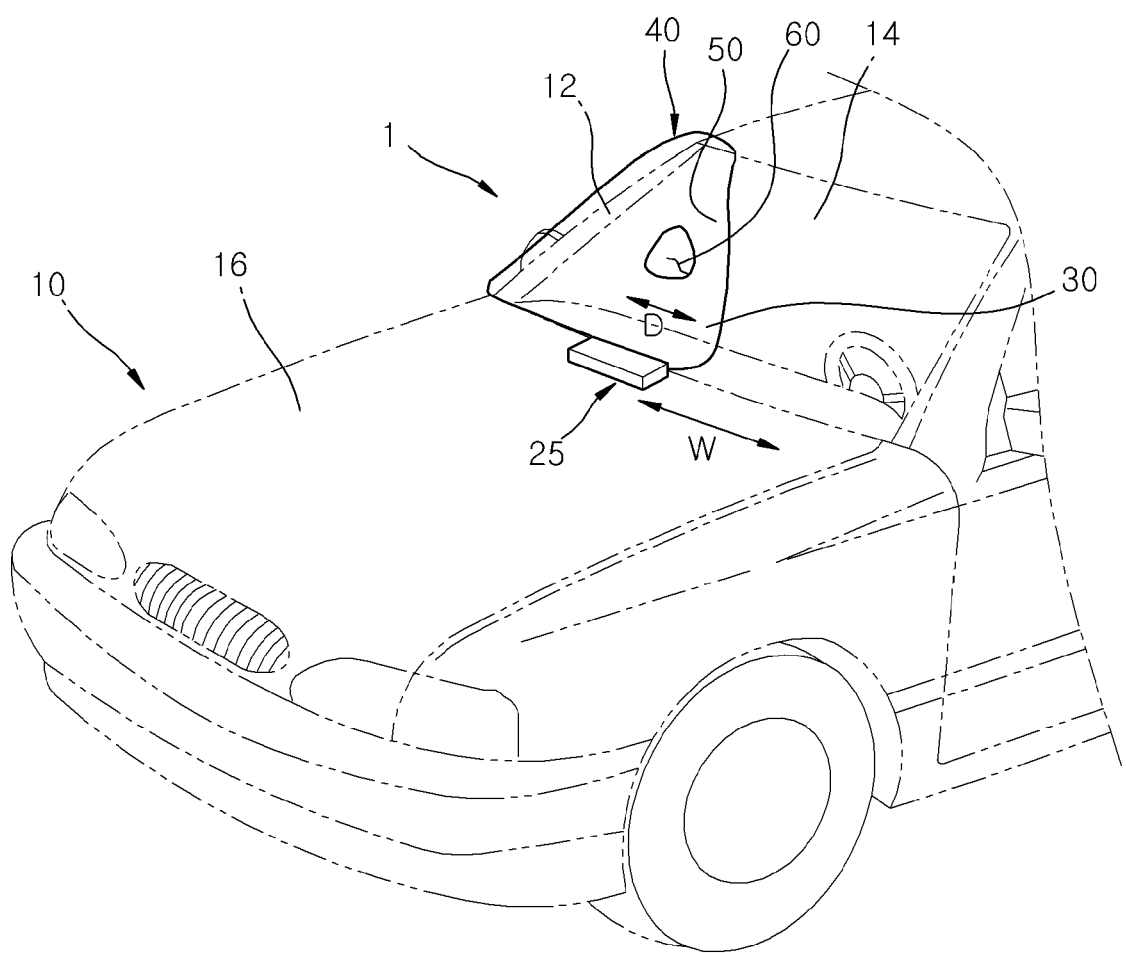
FIG. 1 is a perspective view schematically illustrating an operation state of an air bag cushion device for protecting a pedestrian in accordance with an exemplary embodiment of the present invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

As illustrated in FIGS. 1 to 4, the air bag cushion device 1 for protecting a pedestrian in accordance with an exemplary embodiment of the present invention may include an inflator 20, a main chamber 30, a sub-chamber 40, and a connection path 50. The inflator 20 may be mounted on a vehicle body 10 so as to generate working gas G. The main chamber 30 may receive the working gas G generated from the inflator 20, and expand in the widthwise direction W of the vehicle body 10. The sub-chamber 40 may be connected to the main chamber 30, receive the working gas G through the main chamber 30, and expand to the outside of an A-pillar 12 of the vehicle body 10. The connection path 50 may have both sides connected to the main chamber 30 and the sub-chamber 40 so as to transfer the working gas G.

The vehicle body 10 on which the air bag cushion device 1 is installed may include the A-pillar 12 installed at both sides of a windshield glass 14 of the vehicle, and a hood 16 covering an engine compartment. The hood 16 may be positioned at the lower front of the windshield glass 14. When a pedestrian collides with the vehicle, the pedestrian may bump his/here head against the hood 16 or the -pillar 12. In this case, the pedestrian may incur an additional injury from this collision. Furthermore, the vehicle body 10 in accordance with an exemplary embodiment of the present invention may include a mounting bracket 22 for fixing the inflator 20, and a cover 25 fixed to cover the inflator 20.

The inflator 20 may be mounted on the vehicle body 10, and formed in various forms as long as the inflator 20 can generate working gas G for expanding the main chamber 30 and the sub-chamber 40 when the vehicle collides with a pedestrian. The inflator 20 may be activated by a sensor mounted on the vehicle body 10, when the pedestrian collides with the vehicle body 10. The inflator 20 may inflate the main chamber 30 and the sub-chamber 40 using the working gas G, such as nitrogen, which is generated by momentarily burning a gas forming agent, such as sodium nitride through an ignition system.

The main chamber 30 may be formed to have various structures, as long as the main chamber 30 can receive the working gas G generated from the inflator 20 and expand in the widthwise direction W of the vehicle body 10. The main chamber 30 may expand along the boundary between the bottom of the windshield glass 14 and the hood 16. Thus, the main chamber 30 may prevent an additional injury to the pedestrian, which may occur when the pedestrian bumps his/her head against the hood 16 or the windshield glass 14.

Figure 5A:
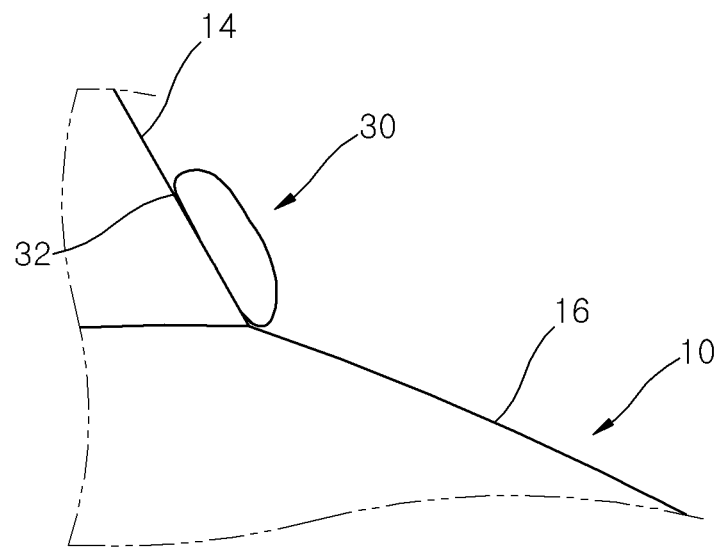
FIG. 5A is a transverse view schematically illustrating an inflated state of a main chamber resting against a windshield of a vehicle, in accordance with a first exemplary embodiment of the present invention.
Figure 5B:
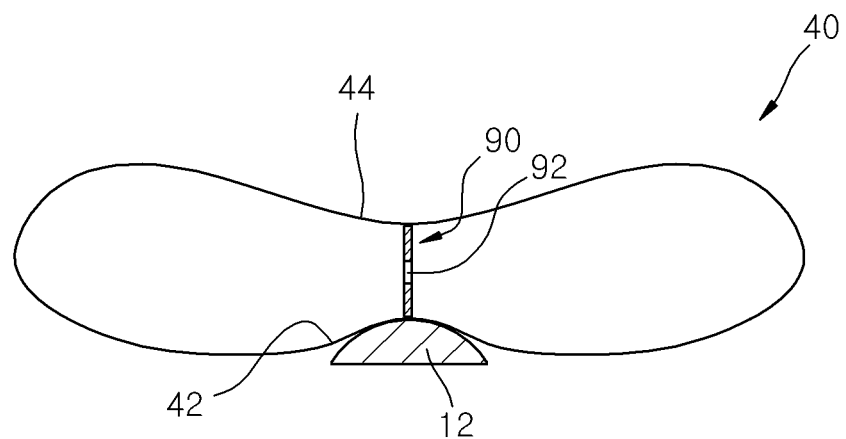
FIG. 5B is a transverse view schematically illustrating an inflated state of a sub-chamber resting against an A-pillar of a vehicle, in accordance with an exemplary embodiment of the present invention.
Figure 6:
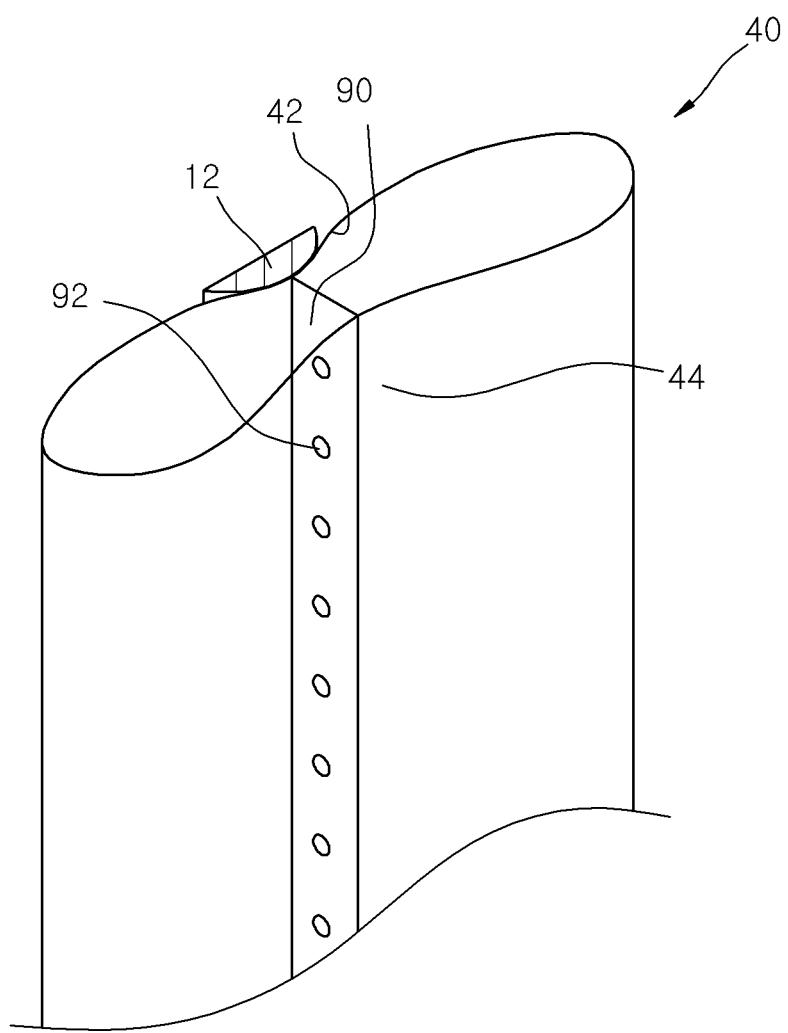
FIG. 6 is a perspective view schematically illustrating a state in which the first connection member is installed in the sub-chamber in accordance with an exemplary embodiment of the present invention.

The main chamber 30 may be installed in such a manner that the inward-facing surface 32 thereof faces the windshield glass 14 of the vehicle body 10, as shown in FIG. 5A. An inward-facing surface 42 of the sub-chamber 40, comes in contact with the A-pillar 12, as shown in FIG. 5B, and may form a curved surface following the shape of the A-pillar 12.

One side of the main chamber 30 (right side in FIG. 2) may have a shape which is curved toward the sub-chamber 40 while expanding from the top of the inflator 20. Alternatively, the one side of the main chamber 30 may be installed in such a shape that is extended in the widthwise direction W of the vehicle body. That is, the shape of the main chamber 30 may be modified in various ways.

As illustrated in FIGS. 2 to 7, the sub-chamber 40 may be connected to the main chamber 30 and formed in to have various shapes, as long as the sub-chamber 40 can receive the working gas G through the main chamber 30 and expand to the outside of the A-pillar 12 of the vehicle body 10 so as to prevent a pedestrian from colliding with the A-pillar 12. The main chamber 30 may be positioned at the front surface of the windshield glass 14, and one side of the main chamber 30 in the longitudinal direction D (left side in FIG. 2) may be connected to the sub-chamber 40. The sub-chamber 40 and the main chamber 30 in accordance with an exemplary embodiment of the present invention may be formed in an L-shape so as to cover the A-pillar 12 of the vehicle body 10 and the front side of the windshield glass 14. The air bag cushion device 1 for protecting a pedestrian may also be installed on the opposite A-pillar 12 facing the A-pillar 12 which has the sub-chamber 40 installed at the front side thereof, in order to reduce the likelihood and/or severity of an injury to a pedestrian who collides with the vehicle. The sub-chamber 40 may be installed in such a manner that the inward-facing surface 42 thereof faces the A-pillar 12 of the vehicle body 10, and the outer surface 44 of the sub-chamber 40 may be isolated from the inward-facing surface 42 of the sub-chamber 40 so as to form the outside of the sub-chamber 40, as shown in FIG. 5B.

The connection path 50 may be formed in various shapes, as long as the connection path 50 can connect the top of the sub-chamber 40 to the main chamber 30 isolated from the sub-chamber 40 in a diagonal direction. The connection path 50 may be installed to prevent the sub-chamber 40 from deviating from the A-pillar 12. The connection path 50 may serve to connect the main chamber 30 to the top of the sub-chamber 40, and a closed space 60 may be formed so as to be surrounded by the connection path 50 and the main and sub-chambers 30 and 40.

In order to prevent the rotation of the sub-chamber 40 and the main chamber 30, the width of the connection path 50 and the angle between the connection path 50 and the main chamber 30 may be adjusted to control a support force for preventing the rotation of the sub-chamber 40.

In the present exemplary embodiment, one connection path 50 may be formed between the sub-chamber 40 and the main chamber 30. If necessary, however, two or more connection paths may be formed. The connection path 50 may be installed in a diagonal direction, and the working gas G of the main and sub-chambers 30 and 40 may be transferred through the connection path 50.

The presence of the connection path 50 makes it possible to prevent rotation of the main and sub-chambers 30 and 40, which may occur when the left and right balance of the air bag cushion device 1 is not maintained while the air bag cushion device 1 is spread. Even when the sub-chamber 40 has a single space or a plurality of spaces formed therein, the working gas G may be uniformly supplied to the main chamber 30 and the sub-chamber 40 through the connection path 50.

For example, if the connection path 50 does not exist, such as the case in which the sub-chamber 40 has a plurality of divided spaces therein, the left and right balance might not be maintained when the air bag cushion device 1 for protecting a pedestrian is spread. Such failure to maintain the left and right balance may indicate that an imbalance occurs in the flow of working gas G supplied to the main chamber 30 and the sub-chamber 40. Thus, the connection path 50 connecting the main chamber 30 and the sub-chamber 40 to each other may be installed to maintain the left and right balance of the main chamber 30 and the sub-chamber 40.

The connection path 50 may be installed in a diagonal direction, or a path having a similar shape to the connection path 50 may be installed.

Furthermore, among the main chamber 30, the sub-chamber 40, and the connection path 50, the closed space 60 to which the working gas G is not supplied may be formed to reduce the entire volume of the cushion.

The closed space 60 may be formed by the main chamber 30, the sub-chamber 40, and the connection path 50, and have the shape of a polygon, a circle, an ellipse, or a closed curve having a curved surface. The closed space 60 may be modified to have various other shapes as well, as long as the closed space 60 can form a closed interval.

Figure 2:
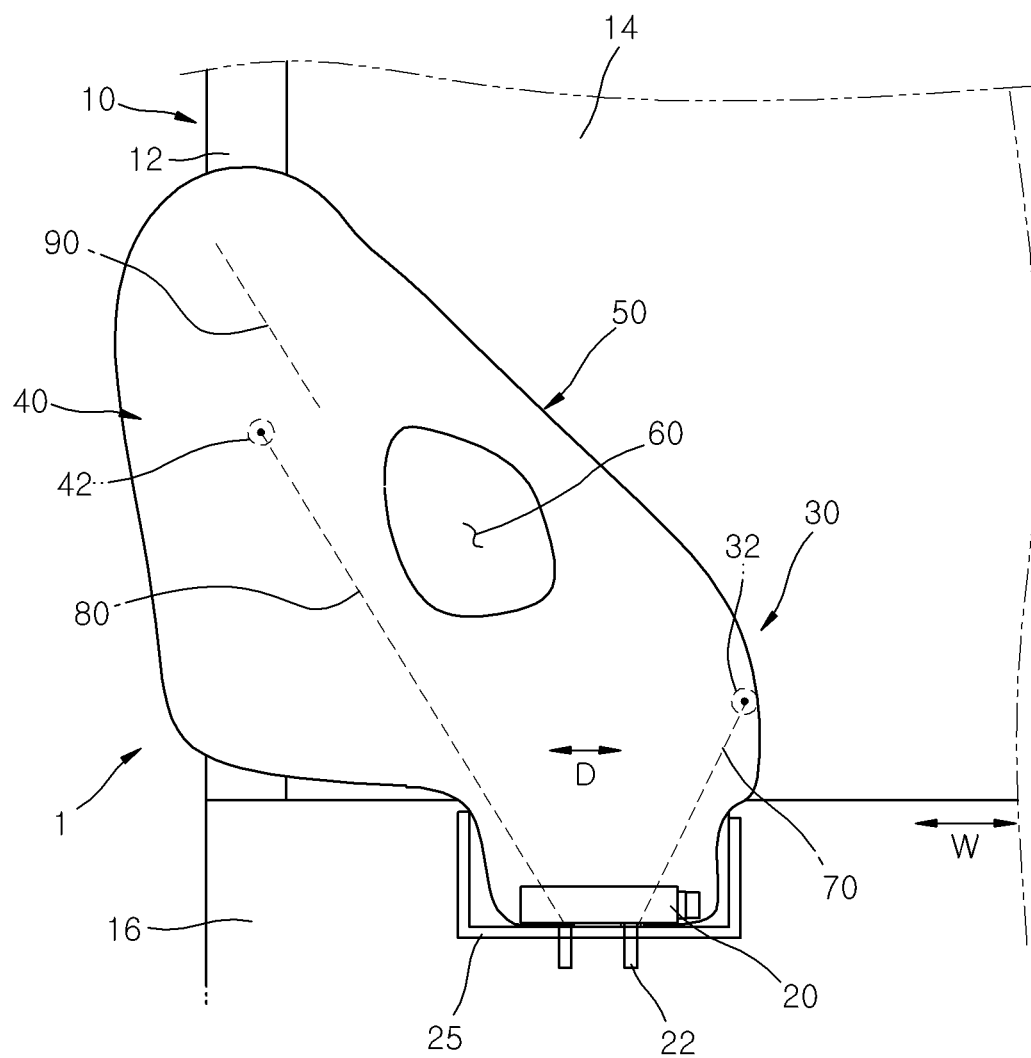
FIG. 2 is a front view schematically illustrating the structure of the air bag cushion device for protecting a pedestrian in accordance with an exemplary embodiment of the present invention.
Figure 3:
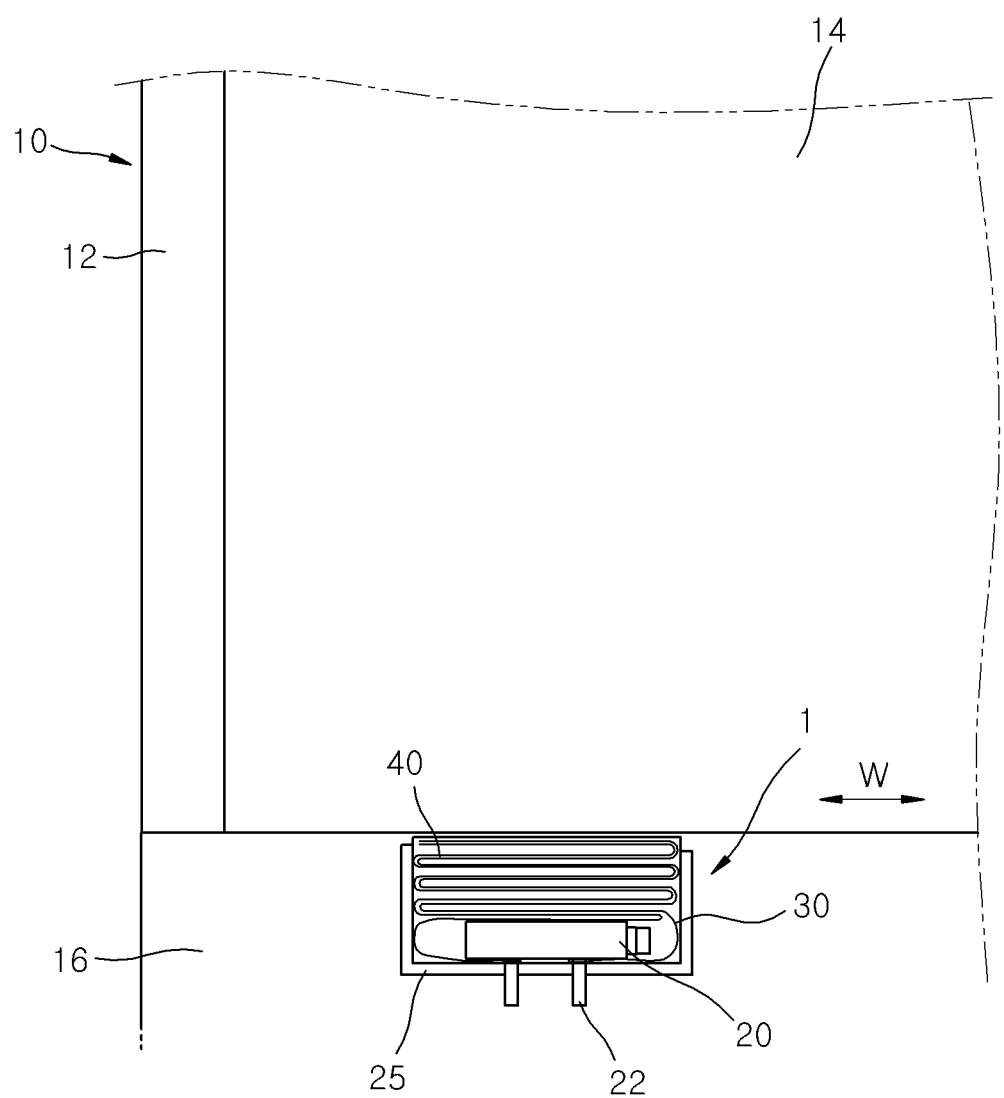
FIG. 3 is a front view schematically illustrating a state before the air bag cushion device for protecting a pedestrian in accordance with an exemplary embodiment of the present invention is operated.
Figure 4:
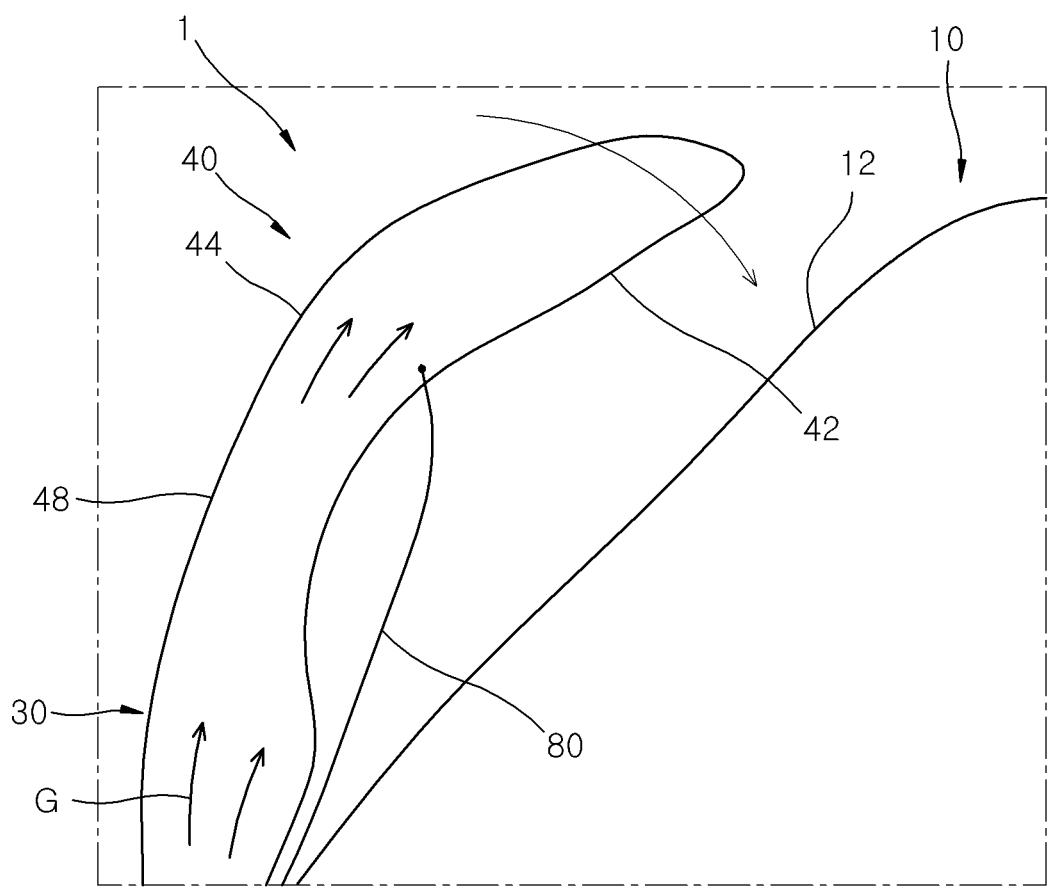
FIG. 4 is a side view schematically illustrating a state in which a sub-chamber in accordance with an exemplary embodiment of the present invention is expanded while being guided by a second guide part.
Figure 8:
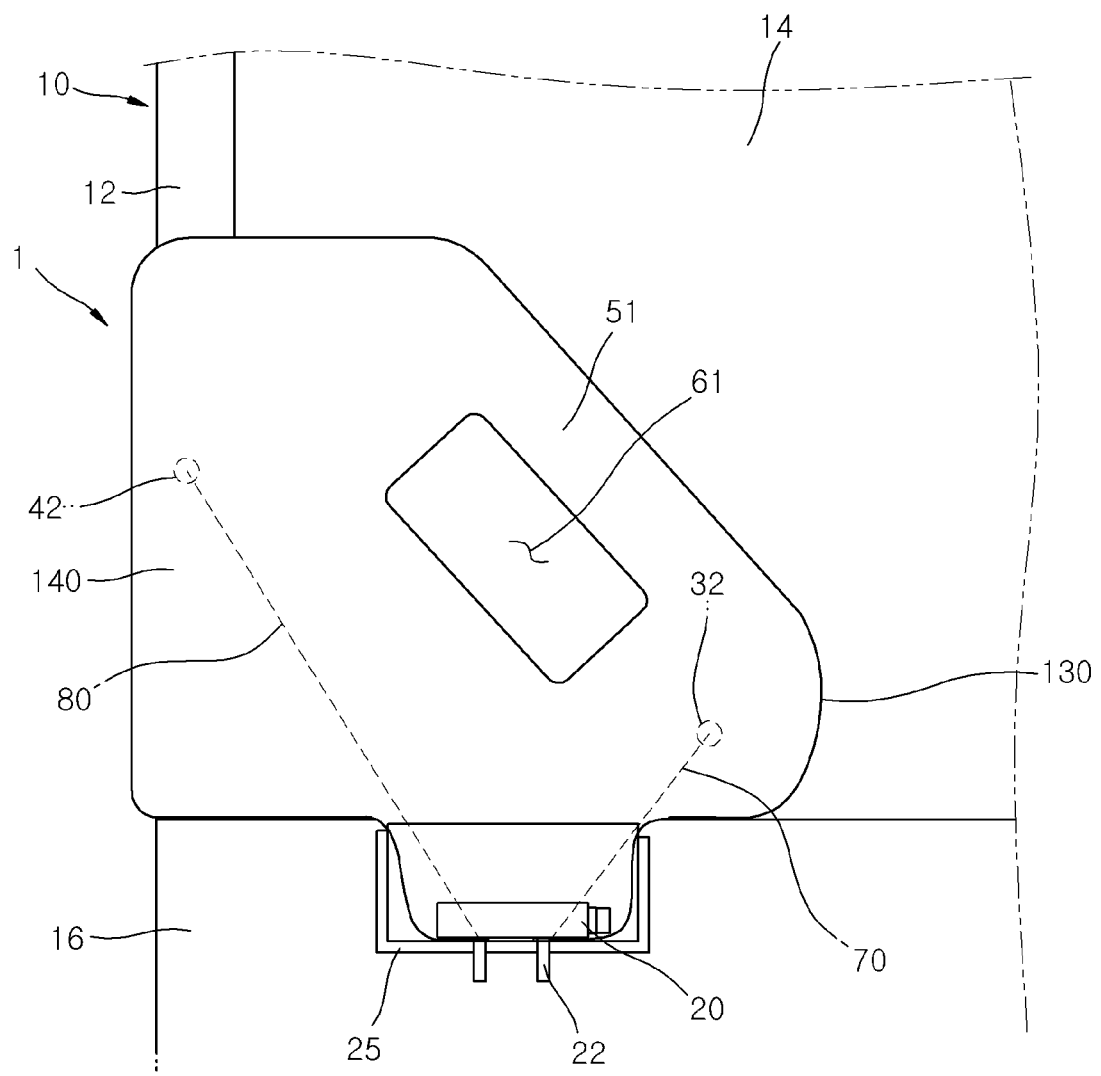
FIG. 8 is a front view schematically illustrating a state in which a closed space in accordance with an exemplary embodiment of the present invention is formed in a rectangular shape.
Figure 9:
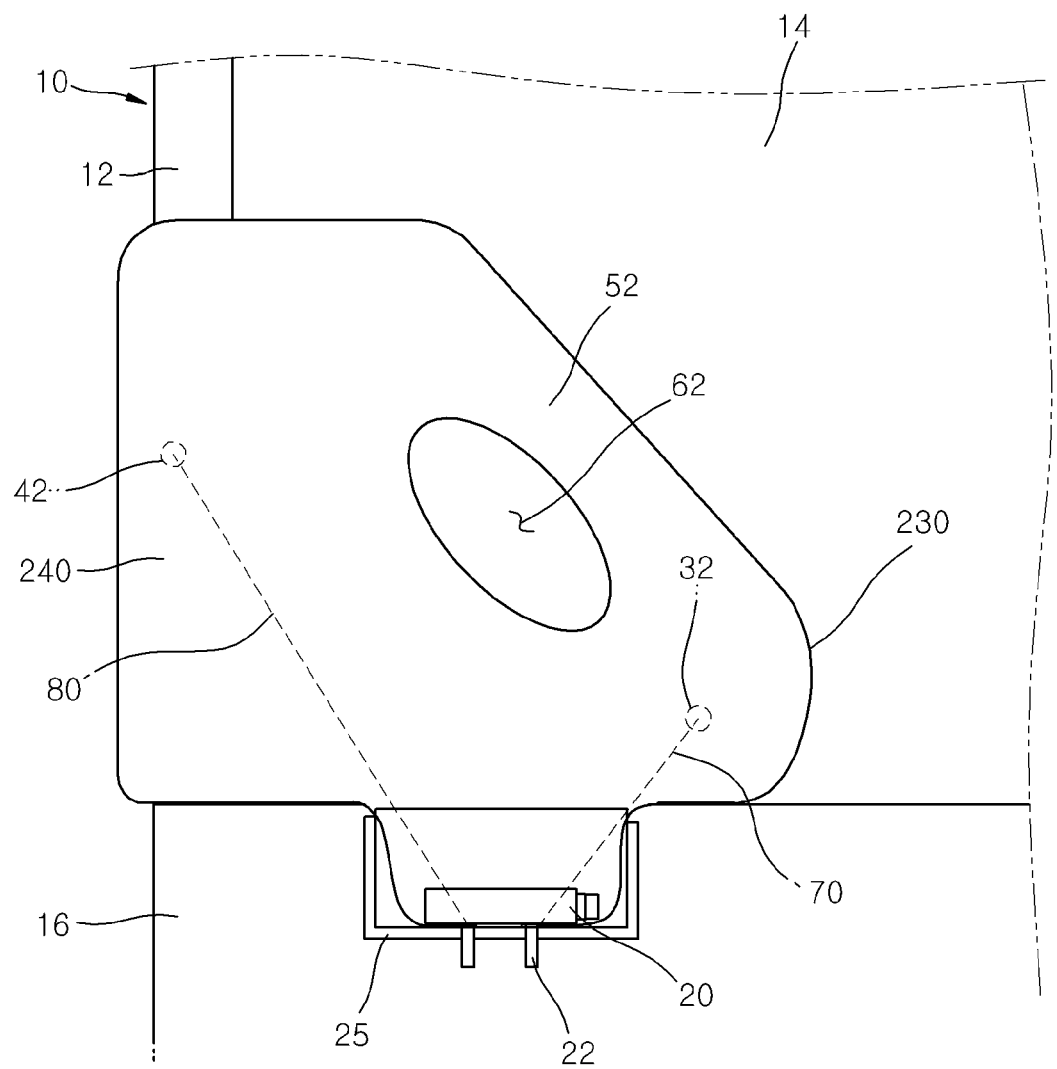
FIG. 9 is a front view schematically illustrating a state in which the closed space in accordance with an exemplary embodiment of the present invention is formed in an elliptical shape.

As illustrated in FIG. 2, the closed space 60 may be formed in a closed curve shape having a curved surface. Alternatively, as illustrated in FIG. 8, a main chamber 130, a sub-chamber 140, and a connection path 51 may be connected to form a closed space 61 having a rectangular shape. As a third alternative, FIG. 9 shows that a main chamber 230, a sub-chamber 240, and a connection path 52 may be connected to form a closed space 62 having an elliptical shape. Thus, the closed space may be modified in various manners.

Referring back to FIG. 2, the first guide part 70 may be formed in various shapes, as long as the first guide part 70 can connect the main chamber 30 to the vehicle body 10 and guide the main chamber 30 to expand toward the vehicle body 10. The first guide part 70 in accordance with an exemplary embodiment may be formed in a string or wire shape. The top of the first guide part 70 may be connected to the inward-facing surface 32 of the main chamber 30, and the bottom of the first guide part 70 may be fixed to the vehicle body 10 or the inflator 20, as shown, for example, in FIG. 2. The bottom of the first guide part 70 may be fixed to the mounting bracket 22 for fixing the inflator 20, and the top of the first guide part 70 may be fixed to the inward-facing surface 32 of the main chamber 30. The first guide part 70 may be installed so as to be inclined in the upper-right diagonal direction based on the inflator 20. Thus, when the main chamber 30 is expanded by the working gas G, the first guide part 70 may pull the inward-facing surface 32 of the main chamber 30 toward the windshield glass 14. Thus, the main chamber 30 may be spread in a direction in which the main chamber 30 comes in contact with the vehicle body 10, and continuously maintain the contact with the vehicle body 10.

The second guide part 80 may connect the sub-chamber 40 to the vehicle body 10. The second guide part 80 may be formed in various shapes, as long as the second guide part 80 can be installed at a predetermined angle with respect to the first guide part 70 and guide the expansion of the sub-chamber 40. The bottom of the second guide part 80 in accordance with an exemplary embodiment may be fixed to the mounting bracket 22 for fixing the inflator 20, and the top of the second guide part 80 may be fixed to the inward-facing surface 42 of the sub-chamber 40, as shown, for example, in FIG. 2. The second guide part 80 may be installed so as to be inclined in the upper-left diagonal direction based on the inflator 20. Thus, when the sub-chamber 40 is expanded by the working gas G, the second guide part 80 may pull the inner-facing surface 42 of the sub-chamber 40 toward the A-pillar 12. Thus, the sub-chamber 40 may be spread in a direction where the sub-chamber 40 comes in contact with the A-pillar 12, and then continuously maintain the contact with the vehicle body 12.

Because the first and second guide parts 70 and 80 are extended in the opposite diagonal directions from the mounting bracket 22 on which the inflator 20 is installed, the main chamber 30 and the sub-chamber 40 may be expanded in a direction where the main chamber 30 and the sub-chamber 40 come in contact with the vehicle body 10. In order for the main chamber 30 and the sub-chamber 40 to expand while rotating in a direction facing the vehicle body 10, the first guide part 70 may be connected to the inward-facing surface 32 of the main chamber 30 facing the vehicle body 10, and the second guide part 80 may be connected to the inward-facing surface 42 of the sub-chamber 40 facing the vehicle body 10. Because the first and second guide parts 70 and 80 are installed, the main chamber 30 and the sub-chamber 40 may be rotated in the direction facing the vehicle body 10 and maintain the contact with the vehicle body 10 including the A-pillar 12.

The first connection member 90 may be installed in a diagonal direction (based on FIG. 2) or a longitudinal direction (vertical direction in FIG. 6) inside the sub-chamber 40 facing the A-pillar 12. The first connection member 90 may be formed in various shapes, as long as the first connection member 90 can connect the inward-facing surface 42 of the sub-chamber 40, facing the A-pillar 12, to the outer surface 44 of the sub-chamber 40, isolated from the A-pillar 12. In the air bag cushion device 1 for protecting a pedestrian, after the air bag is spread, the sub-chamber 40 should be held on the A-pillar 12 without left or right movement, until the pedestrian collides with either the main chamber 30 or the sub-chamber 40. In order for the sub-chamber 40 to be held on the A-pillar 12 for a long period of time, the shape of the inner surface 42 of the sub-chamber 40 needs to be modified according to the shape of the A-pillar 12. The shape of the inner surface 42 of the sub-chamber 40 may be modified by varying the height of the first connection member 90. When the height of the first connection member 90 is varied according to the curved shape of the A-pillar 12, the shape of the sub-chamber 40 may be modified according to the A-pillar 12, while the shapes of the inward-facing and outer surfaces 42 and 44 of the sub-chamber 40 connected to the first connection member 90 are varied. Because the first connection member 90 includes a plurality of connection holes 92 through which the working gas G passes, the sub-chamber 40 positioned in the left and right side of the first connection member 90 may be easily expanded. At this time, a plurality of first connection members 90 may be installed in the sub-chamber 40, if necessary. The first connection member 90 may be formed of the same material as the sub-chamber 40, and include various types of materials as long as the first connection member 90 can be easily folded and expanded by the working gas G.

In the exemplary embodiment described above, the widthwise direction W of the vehicle body 10 and the longitudinal direction D of the main chamber 30 may indicate the same direction.

In the exemplary embodiment described above, only one air bag cushion device 1 is used, for example. A plurality of air bag cushion devices 1 may be installed to also achieve the purpose of the present invention.

Figure 7:
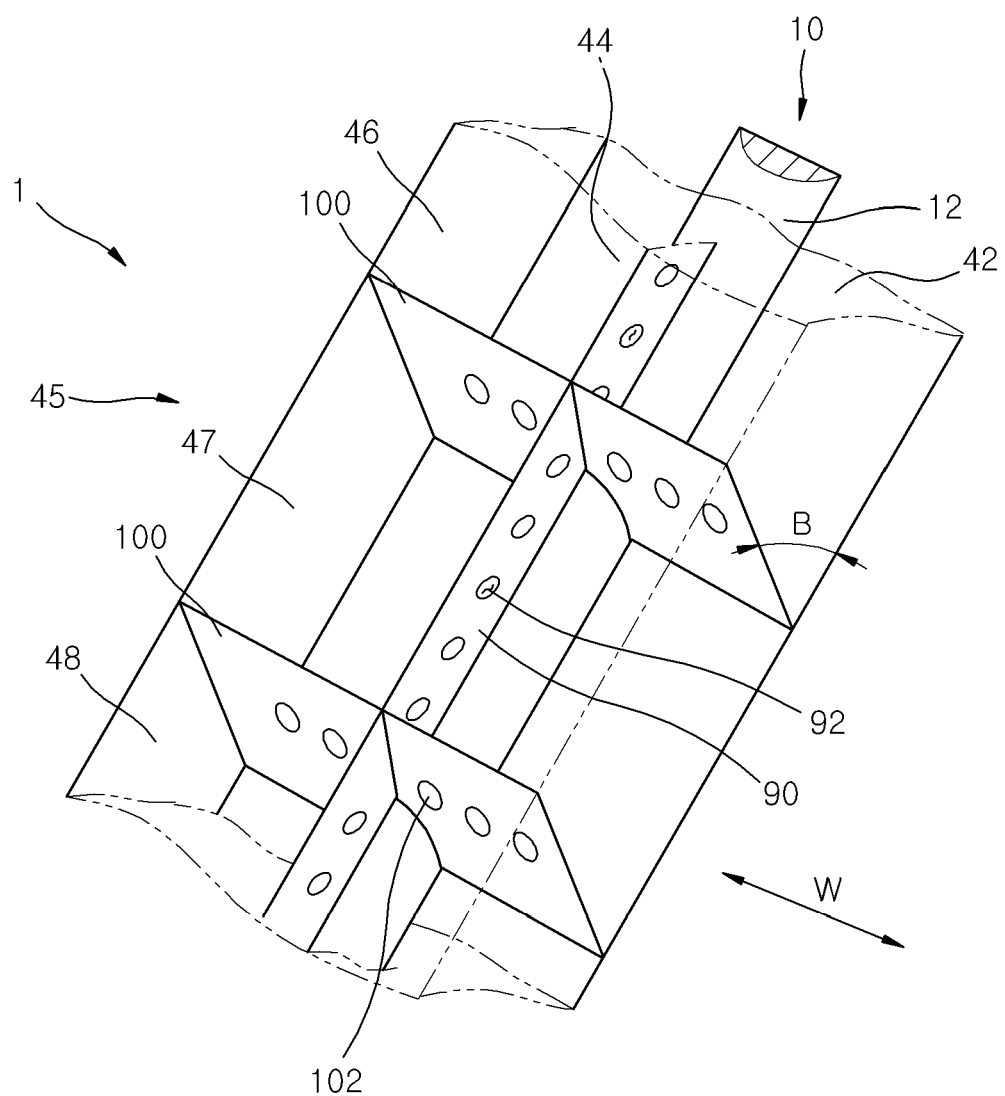
FIG. 7 is a perspective view schematically illustrating a state in which the first connection member and a second connection member are installed in the sub-chamber in accordance with an exemplary embodiment of the present invention.

As illustrated in FIG. 7, the first connection member 90 and a second connection member 100 may be installed together in a sub-chamber 45. The first connection member 90 may be modified in various manners, as long as the first connection member 90 is positioned in the sub-chamber 45 facing the A-pillar 12 and installed in a direction crossing the second connection member 100. The first connection member 90 may be installed in the sub-chamber 45 facing the A-pillar 12. As the height of the first connection member 90 is varied according to the shape of the A-pillar 12, the inner surface 42 of the sub-chamber 45 may be modified according to the shape of the A-pillar 12. Furthermore, the first and second connection members 90 and 100 may be installed at various angles while crossing each other.

The air bag cushion device 1 for protecting a pedestrian may be inflated in various shapes depending on the modified shapes of the main chamber 30, the sub-chamber 40, and the connection path 50, 51, or 52. As illustrated in FIG. 2, the main chamber 30 may be installed in the horizontal direction, the sub-chamber 40 may be extended to the top of the main chamber 30, and the connection path 50 may be installed to connect the sides of the main chamber 30 and the sub-chamber 40.

Figure 10:
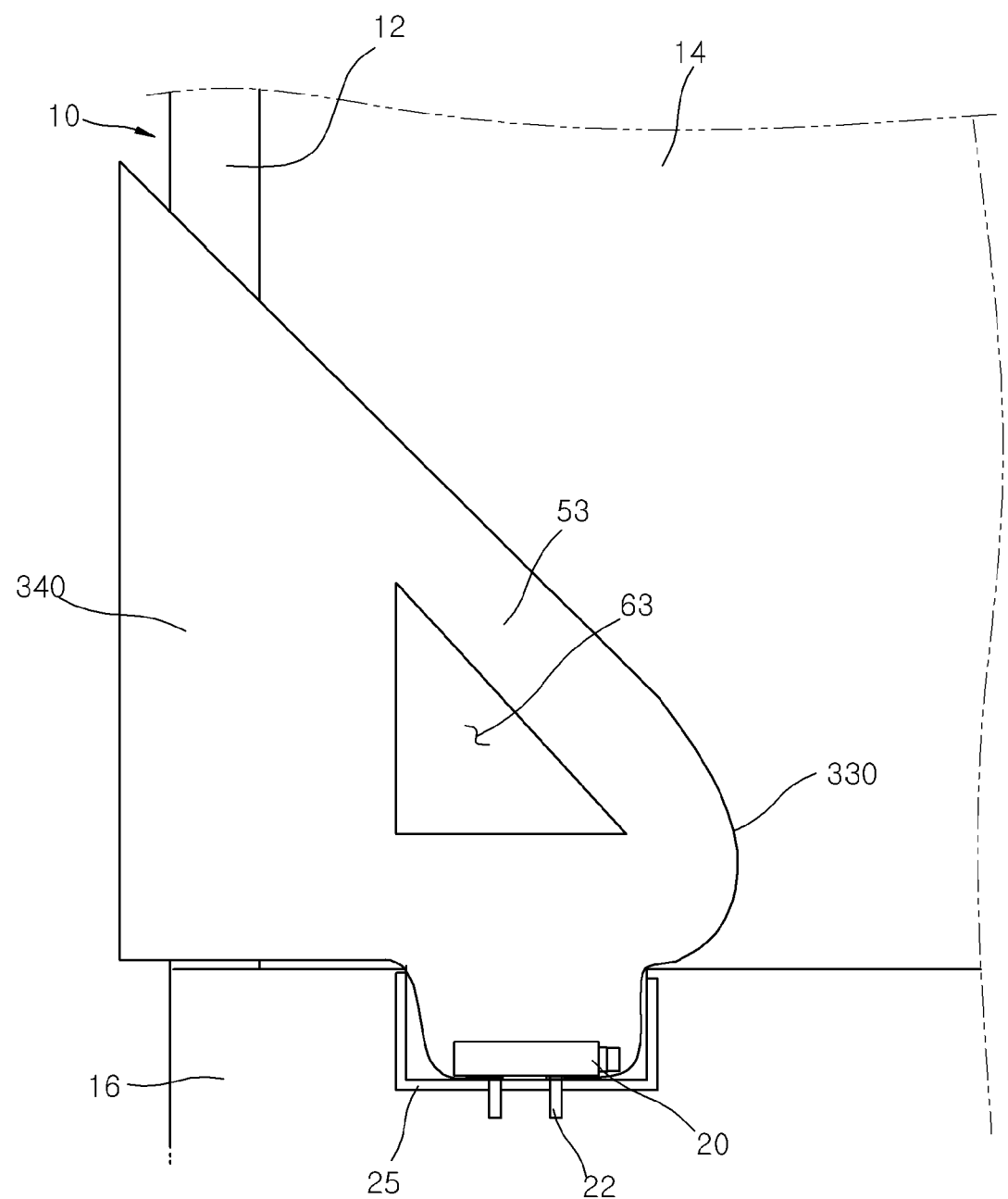
FIG. 10 is a front view schematically illustrating a state in which the main chamber, the sub-chamber, and a connection path in accordance with an exemplary embodiment of the present invention are connected to each other and expanded in a triangular shape.
Figure 11:
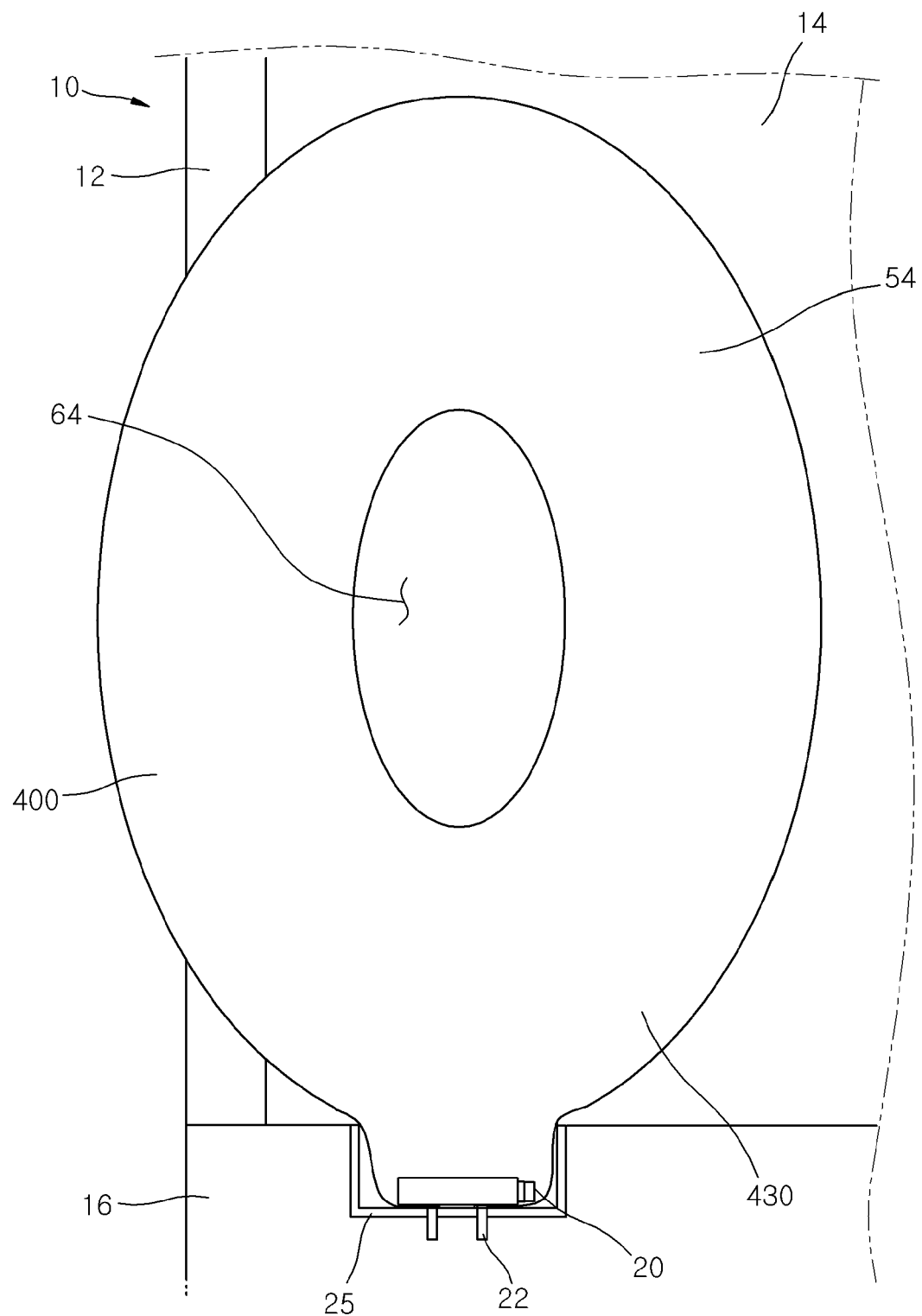
FIG. 11 is a front view schematically illustrating a state in which the main chamber, the sub-chamber, and the connection path in accordance with an exemplary embodiment of the present invention are connected to each other and expanded in an elliptical shape.
Figure 12:
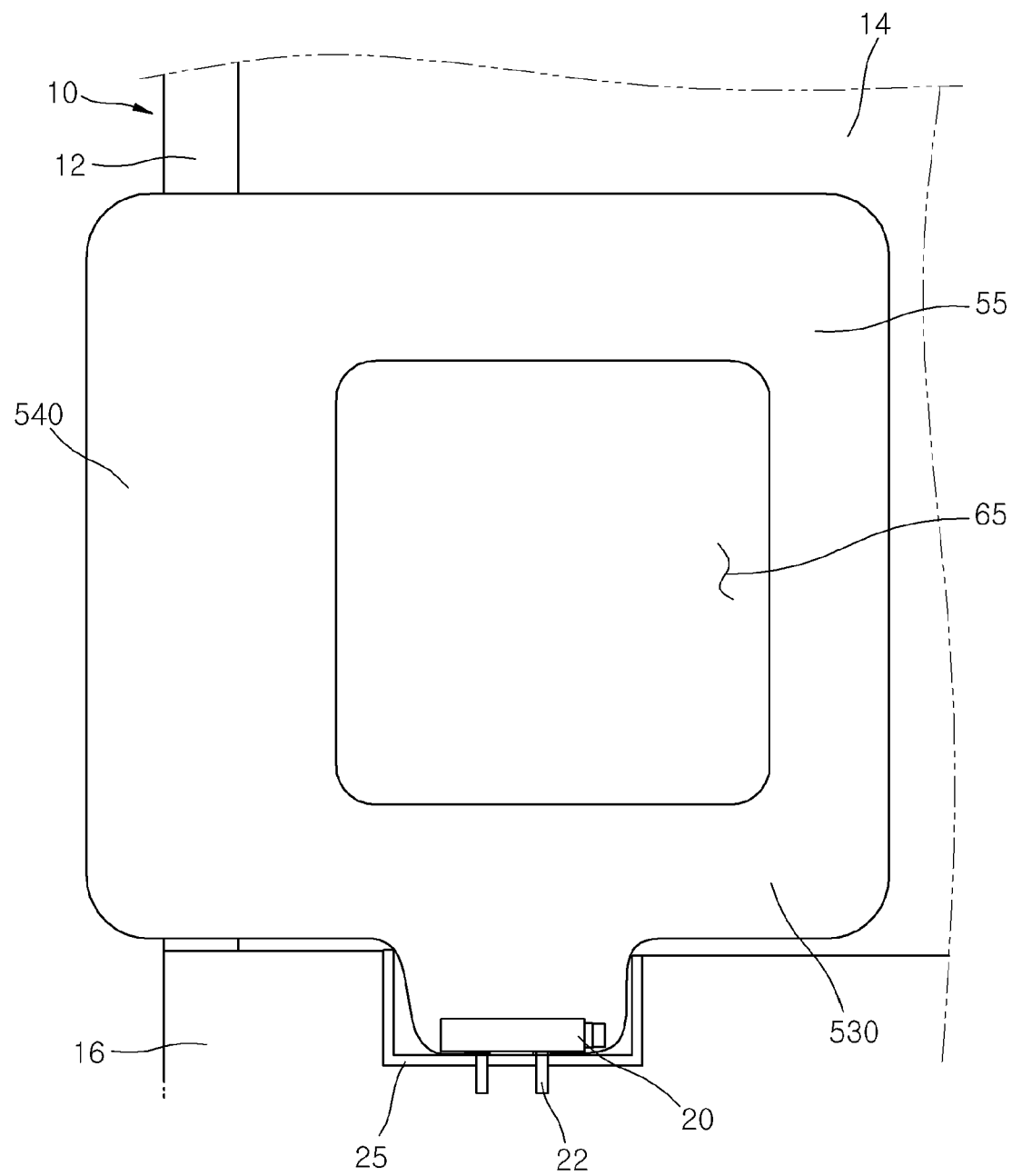
FIG. 12 is a front view schematically illustrating a state in which the main chamber, the sub-chamber, and the connection path in accordance with an exemplary embodiment of the present invention are connected to each other and expanded in a rectangular shape.

Alternatively, as illustrated in FIG. 10, the main chamber 330, the sub-chamber 340, and the connection path 53 may be connected to form a triangular shape including a closed space 63 as a whole. Furthermore, as illustrated in FIG. 11, the main chamber 430, the sub-chamber 440, and the connection path 54 may be connected to form an elliptical shape including a closed space 64 as a whole. Furthermore, as illustrated in FIG. 12, the main chamber 530, the sub-chamber 540, and the connection path 55 may be connected to form a rectangular shape including a closed space 65 as a whole. The sub-chamber 40, 140, 240, 350, 440, or 540 may be expanded at the front of the A-pillar 12 so as to prevent a pedestrian from colliding with the A-pillar 12.

Hereafter, referring to the accompanying drawings, the operation state of the air bag cushion device 1 for protecting a pedestrian in accordance with the an exemplary embodiment of the present invention will be described in detail.

When a pedestrian collides with the front of the vehicle body 10, the inflator 20 may be operated according to a measurement value of the sensor mounted on the vehicle body 10. The inflator 20 may generate working gas G, and the working gas may be supplied to inflate the main chamber 30. Because the expansion of the main chamber 30 is guided by the first guide part 70, the main chamber 30 may be expanded while rotating in the direction facing the vehicle body 10. Thus, even after the main chamber 30 is completely expanded, the contact between the main chamber 30 and the vehicle body 10 may be maintained for a long time.

Furthermore, as the working gas G supplied to the main chamber 30 is transferred to the sub-chamber 40 connected to one side of the main chamber 30, the sub-chamber 40 may be expanded along the A-pillar 12. Because the rotation of the sub-chamber 40 toward the A-pillar 12 is guided by the second guide part 80, the contact between the sub-chamber 40 and the A-pillar 12 may be maintained for a long period of time, even after the sub-chamber 40 is completely expanded.

When the sub-chamber 40 is expanded, the first connection member 90 may control the shape of the inward-facing surface 42 of the sub-chamber 40. Thus, the sub-chamber 40 may be installed outside the A-pillar 12 in a state where the shape of the inner surface of the sub-chamber 40 is varied along the shape of the curved surface of the A-pillar 12. Thus, because the sub-chamber 40 can maintain the contact with the outside of the A-pillar 12 for a long period of time, the sub-chamber 40 may prevent additional injury to the pedestrian, which may occur when the pedestrian collides with the A-pillar 12.

Because the working gas G supplied to the sub-chamber 40 and the main chamber 30 is moved through the connection path 50, it is possible to prevent rotation which may occur due to an imbalance of the working gas G supplied to the sub-chamber 40 and the main chamber 30.

Hereafter, an air bag cushion device 3 for protecting a pedestrian in accordance with another exemplary embodiment of the present invention will be described in detail.

For convenience of description, the same components as those of the first embodiment are represented by like reference numerals, and the detailed descriptions thereof are omitted herein.

Figure 13A:
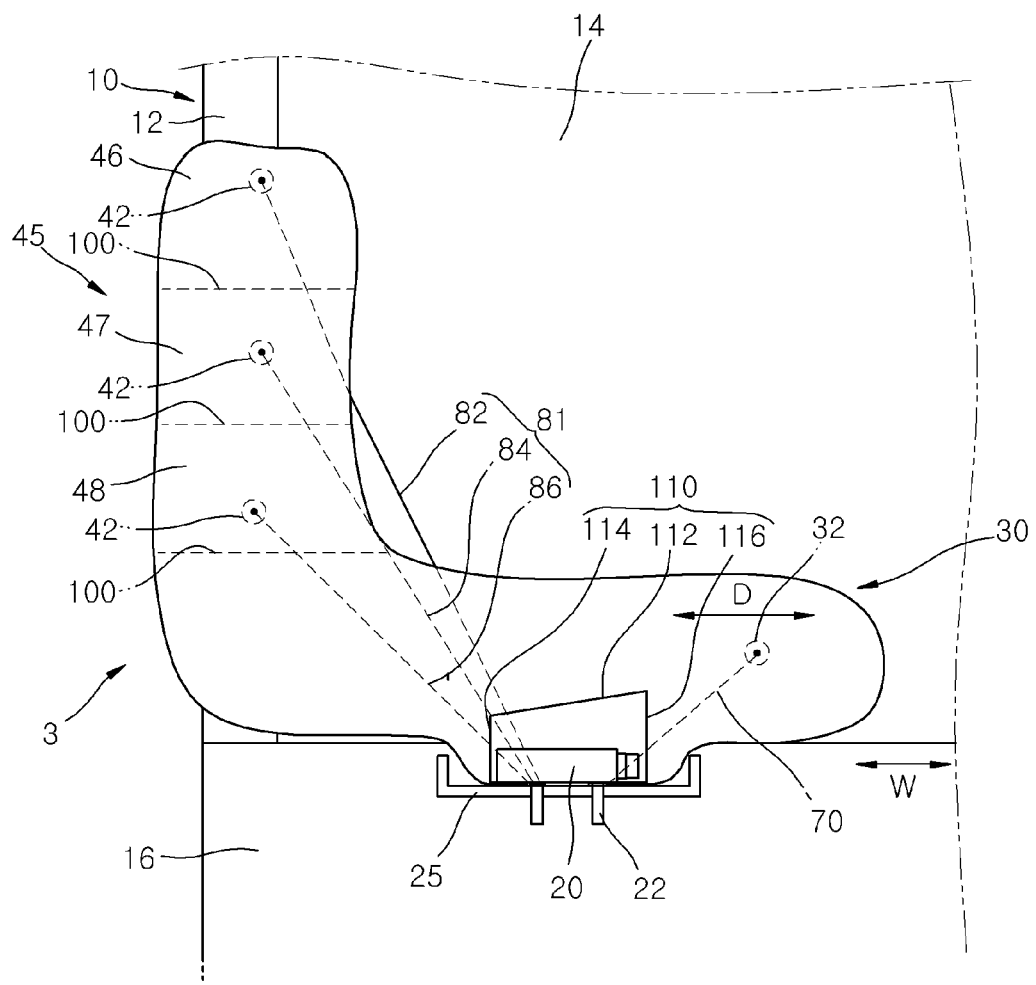
FIG. 13A is a front view schematically illustrating the structure of an air bag cushion device for a protecting a pedestrian in accordance with another exemplary embodiment of the present invention.

As illustrated in FIG. 13A, the air bag cushion device 3 for protecting a pedestrian in accordance with an exemplary embodiment may include a sub-chamber 45 divided into a plurality of chambers. The sub-chamber 45 in accordance with this exemplary embodiment may be modified in various ways, as long as the sub-chamber 45 can be divided into a plurality of chambers by a second connection member 100 installed therein. The sub-chamber 45 may include first to third chambers 46, 47, and 48, and the second connection member 100 may be installed at the boundary between the respective chambers so as to divide the adjacent chambers. The number of chambers included in the sub-chamber 45 is not limited to three, but can be increased or decreased according to the use state.

The air bag cushion device 3 for protecting a pedestrian may include the main chamber 30 and the sub-chamber 45 having one or more chambers. The main chamber 30 may absorb the initial pressure of the working gas G from the inflator, and distribute the working gas G to the respective chambers formed in the sub-chamber 45. Between the adjacent chambers of the sub-chamber 45, the second connection member 100 having a diaphragm shape and serving as an inner tether may be installed to adjust the distribution speed of the working gas G, and induce the sub-chamber 45 to be spread along the vehicle body 10 including the A-pillar 12. Because first and second guide parts 70 and 81 serving as outer tethers are connected to the main chamber 30 and the sub-chamber 45, the first and second guide parts 70 and 81 may minimize left or right movement when the main chamber 30 and the sub-chamber 45 are expanded. Furthermore, the first and second guide parts 70 and 81 may induce the main chamber 30 and the sub-chamber 40 to be spread toward the windshield glass 14.

As illustrated in FIGS. 7 to 13A, the second connection member 100 installed in the sub-chamber 45 may have a plurality of second connection holes 102 through which working gas G passes. Inside the sub-chamber 45, the second connection member 100 may be installed in the widthwise direction W of the vehicle body 10. The second connection member 100 may be formed of a flexible material. One side of the second connection member 100 (right side in FIG. 7) may be fixed to the inward-facing surface 42 of the sub-chamber 45, and the other side of the second connection member 100 (left side in FIG. 7) may be fixed to the outer surface 44 of the sub-chamber 45. The other side of the second connection member 100 may be positioned at a lower level than one side of the second connection member 100. Thus, when the working gas G is supplied through the second connection holes 102 of the second connection member 100, the sub-chamber 45 may be expanded, and the second connection member 100 may be installed in a diagonal direction while forming a preset inclined angle B with respect to the inner surface 42 of the sub-chamber 45.

If the second connection member 100 is not installed in the sub-chamber 45, the sub-chamber 45 may be bent to the outside of the A-pillar 12 while being spread by the working gas G. Thus, the sub-chamber 45 may be spread in a state where the sub-chamber 45 is substantially perpendicular to the A-pillar 12.

Thus, when the inclined second connection member 100 is added to the inside of the sub-chamber 45, the second connection member 100 may induce the rotation of the sub-chamber 45 in the clockwise direction (based on FIG. 10) about one side of the second connection member 100 connected to the inner surface 42 of the sub-chamber 45. Furthermore, the flow of the working gas G supplied to the respective chambers may be adjusted through the second connection holes 102 formed in the second connection member 100.

Because the second connection member 100 is installed at the preset inclined angle with respect to the A-pillar 12 when the sub-chamber 45 is spread, the working gas G passing through the second connection holes 102 of the second connection member 100 may pressurize the inner surface 42 of the sub-chamber 45 toward the vehicle body 10. Thus, the sub-chamber 45 may be expanded to come in contact with the vehicle body 10 while rotating in the direction facing the vehicle body 10 (the clockwise direction in FIG. 10). When the sub-chamber 45 is spread upward along the A-pillar 12, the second connection member 100 may be installed in the horizontal direction of the sub-chamber 45 so as to guide the expansion of the sub-chamber 45.

Inside the sub-chamber 45, only the first connection member 90 may be installed in the vertical direction or only the second connection member 100 may be installed in the horizontal direction.

Figure 13B:
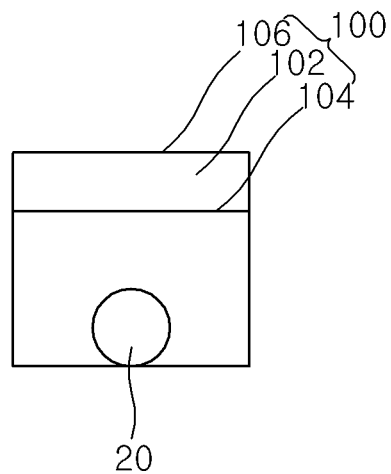
FIG. 13B is a left side view of the gas discharge unit of the exemplary embodiment of FIG. 13A.
Figure 13C:
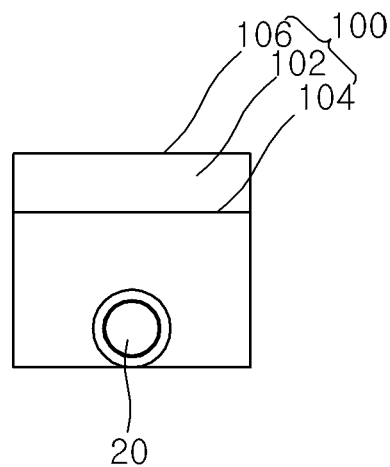
FIG. 13C is a right side view of the gas discharge unit of the exemplary embodiment of FIG. 13A.

The gas discharge unit 110 installed outside the inflator 20 may be formed in various shapes, as long as the gas discharge unit 110 has discharge ports formed at both sides thereof so as to adjust the discharge amount of working gas G generated from the inflator 20. The gas discharge unit 110 in accordance with an exemplary embodiment may include a discharge body 112, a first discharge port 114, and a second discharge port 116, as shown in FIGS. 13A, 13B, and 13C.

The discharge body 112 may be formed in various shapes, as long as the working gas G generated from the inflator 20 can be supplied to the discharge body 112. The inflator 20 and the discharge body 112 in accordance with this exemplary embodiment may be positioned in the main chamber 30, and the discharge body 112 may be installed so as to cover the outside of the inflator 20.

The first discharge port 114 may discharge the working gas G to one side of the main chamber 30 (left side in FIG. 12), facing the sub-chamber 45. The second discharge port 116 may discharge the working gas G to the other side of the main chamber 30 (right side in FIG. 12), corresponding to the opposite side of the first discharge port 114. The second discharge port 116 in accordance with the this exemplary embodiment may have a larger area than the first discharge port 114, as shown in FIGS. 13B and 13C. Thus, the left and right balance of the air bag cushion device 3 for protecting a pedestrian may be easily maintained.

The areas of the first and second discharge ports 114 and 116 may be changed to control the flow rate of the discharged working gas G. Thus, the left and right balance of the main chamber 30 and the sub-chamber 45 may be maintained. If the first discharge port 114 has a larger area than the second discharge port 116, the sub-chamber 45 may be excessively rotated. In this case, excessive expansion movement may occur.

The second guide part 81 may be modified in various ways, as long as the second guide part 81 can guide the sub-chamber 45 to come in contact with the vehicle body 10 while the sub-chamber 45 is rotated in the direction facing the vehicle body 10. The second guide part 81 in accordance with an exemplary embodiment may be connected to each of the chambers included in the sub-chamber 45. The second guide part 81 may include a first member 82 connected to the first chamber 46, a second member 84 connected to the second chamber 47, and a third member 86 connected to the third chamber 48. The tops of the first to third members 82 to 86 may be connected to the inward-facing surfaces 42 of the respective chambers, and the bottoms of the first to third members 82 to 86 may be fixed to the vehicle body 10 including the inflator 20 or the mounting bracket 22. Because the first and second guide parts 70 and 81 are installed in a V-shape around the inflator 20, the main chamber 30 and the sub-chamber 45, which are spread toward both top sides of the inflator 20, may be expanded in a direction where the main chamber 30 and the sub-chamber 45 come in contact with the vehicle body 10.

Hereafter, referring to the accompanying drawings, the operation state of the air bag cushion device 3 for protecting a pedestrian in accordance with this exemplary embodiment of the present invention will be described in detail.

The main chamber 30 and the sub-chamber 45 may be stored inside the cover 25 with the inflator 20 at normal times. When the vehicle collides with a pedestrian, the sub-chamber 45 may be expanded to the front of the A-pillar and the main chamber 30 may be expanded to the front of the windshield glass 14 so as to reduce the injury of the pedestrian.

The working gas G generated from the inflator 20 may expand the main chamber 30 to some extent. Then, the working gas G may be supplied to the respective chambers of the sub-chamber 45 through the second connection member 100 formed in the sub-chamber 45. The working gas G may be transferred to the third chamber 48, the second chamber 47, and the first chamber 46 through the second connection holes 102 formed in the second connection member 100.

Because the second connection member 100 is installed at the preset inclined angle B, the working gas G passing through the second connection holes 102 formed in the second connection member 100 may be transferred while pressurizing the inner surface 42 of the sub-chamber 45 toward the A-pillar 12. Thus, the sub-chamber 45 may be expanded while rotating in a direction where the sub-chamber 45 comes in contact with the vehicle body 10.

When the gas discharge unit 110 is installed outside the inflator 20, the main chamber 30 starts to be inflated before the sub-chamber 45, because a larger part of the working gas G generated from the inflator 20 is transferred through the second discharge port 116 having a larger area than the first discharge port 114. Thus, because the sub-chamber 45 starts to expand in a state where the main chamber 30 is already partially expanded, rotation which occurs when the sub-chamber 45 is expanded may be reduced. Thus, the sub-chamber 45 may be stably expanded.

Hereafter, an air bag cushion device 4 for protecting a pedestrian in accordance with a third exemplary embodiment of the present invention will be described in detail.

For convenience of description, the same components as those of the first embodiment are represented by like reference numerals, and the detailed descriptions thereof are omitted herein.

Figure 14:
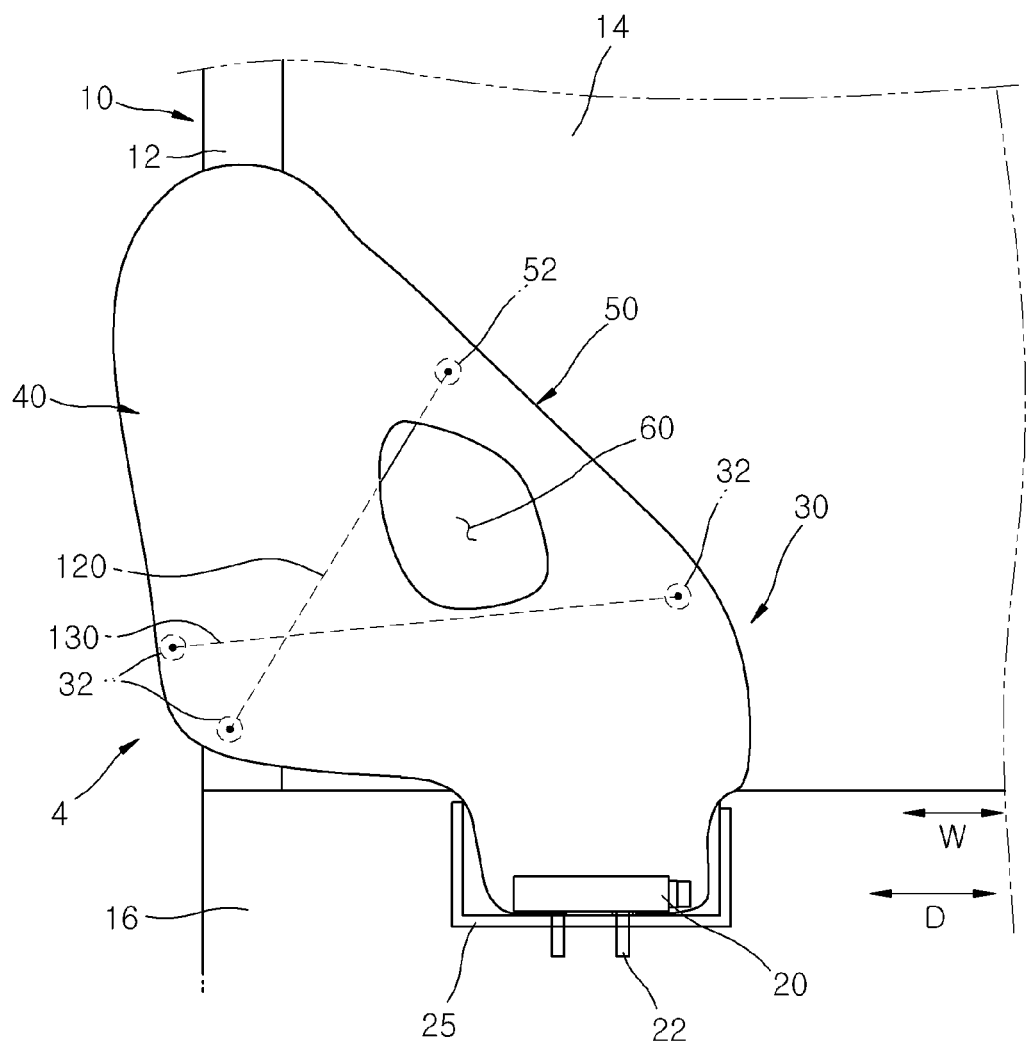
FIG. 14 is a front view illustrating the structure of an air bag cushion device for a protecting a pedestrian in accordance with still another exemplary embodiment of the present invention.

FIG. 14 is a front view illustrating the structure of an air bag cushion device for a protecting a pedestrian in accordance with a third exemplary embodiment of the present invention.

As illustrated in FIG. 14, the air bag cushion device 4 for protecting a pedestrian in accordance with the third exemplary embodiment of the present invention may include third and fourth guide parts 120 and 130 installed to cross each other. The third and fourth guide parts 120 and 130 may serve as outer tethers for guiding the expansion of the main chamber 30 and the sub-chamber 40. The third and fourth guide parts 120 and 130 may be installed in a diagonal direction of the air bag cushion device 4 which is completely expanded, and prevent the air bag cushion device 4 from rotating to the right (based on FIG. 14). Thus, the air bag cushion device 4 can maintain the state in which the air bag cushion device 4 covers the outside of the A-pillar 12.

That is, the third and fourth guide parts 120 and 130 serving as outer tethers may be installed in the horizontal or diagonal direction of the air bag cushion device 4, and installed to cross each other. Thus, while the rotation of the main chamber 30 of the air bag cushion device 4 is restricted, the third and fourth guide parts 120 and 130 crossing in an X-shape may be connected to the right top from the left bottom of the air bag cushion device 4, thereby preventing the air bag cushion device 4 from rotating to the right.

Furthermore, when the third and fourth guide parts 120 and 130 crossing in the X-shape are used as outer tethers of the air bag cushion device 4, the spreading stability of the air bag cushion device 4 can be significantly improved.

The third guide part 120 in accordance with the third exemplary embodiment may guide the expansion of the connection path 50 while connecting the main chamber 30 and the connection path 50, and the fourth guide part 130 may guide the expansion of the main chamber 30 while connecting one side and the other side of the main chamber 30 (left and right sides in FIG. 14), and cross the third guide part 120. The third and fourth guide parts 120 and 130 may be installed to cross each other in an X-shape. Thus, when the air bag cushion device 4 is expanded, tension may be generated between the third and fourth guide parts 120 and 130 having a wire shape, and pull the top of the air bag cushion device 4 to the bottom, thereby restricting the air bag cushion device 4 from rotating toward the front surface of the vehicle body.

Both sides of the third guide part 120 may be connected to the inward-facing surface 32 of the main chamber 30 facing the vehicle body and the inward-facing surface 33 of the connection path 50 facing the windshield glass 14, and the fourth guide part 130 may be connected to the inward-facing surface of the main chamber 30 facing the vehicle body. Furthermore, the bottom of the third guide part 120 and one side of the fourth guide part 130 may be connected to the inward-facing surface 32 of the main chamber 30 facing the A-pillar 12.

Thus, the one side of the fourth guide part 130 may be positioned at the lower part of the air bag cushion device 4, facing the A-pillar 12, and one side of the third guide part 120 may be positioned at the lower part of the fourth guide part 130. The other side of the fourth guide part 130 may be connected to the right side of the air bag cushion device 4, and the one side of the third guide part 120 may be connected to the right upper part of the air bag cushion device 4. Thus, the main chamber 30 and the sub-chamber 40 may be stably expanded.

In the air bag cushion device 4 in accordance with the third exemplary embodiment, the inside of the sub-chamber 40 may be divided into a plurality of chambers. The sub-chamber 40 may be modified in various manners. For example, the first and second connection members 90 and 100 in accordance with the first and second embodiments may be installed in the sub-chamber 40.

As described above, while the sub-chamber 40, 45, 140, 240, 340, 440, or 540 expanded through the operation of the inflator 20 comes in contact with the outside of the A-pillar 12, the air bag may be stably spread. Thus, the air bag cushion device can prevent a pedestrian from colliding with the A-pillar, thereby reducing the injury of the pedestrian.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. An air bag cushion device for protecting a pedestrian, comprising:
   an inflator mounted on a vehicle body and configured to generate a working gas;
   a main chamber configured to receive the working gas generated from the inflator and expand in a widthwise direction of the vehicle body;
   a sub-chamber connected to the main chamber, configured to receive the working gas through the main chamber, and expand to the outside of an A-pillar of the vehicle body;
   a connection path having both sides connected to the main chamber and the sub-chamber, respectively, so as to transfer the working gas between the main chamber and the sub-chamber;
   a first connection member installed in the sub-chamber extending in a longitudinal direction of the A-pillar, and connecting the inward-facing surface of the sub-chamber, facing the A-pillar, to the outer surface of the sub-chamber, isolated from the A-pillar; and
   a second connection member installed in the sub-chamber in a direction crossing the first connection member and dividing the sub-chamber into a plurality of chambers, wherein:
   the first connection member comprises a plurality of first connection holes through which working gas passes; and
   the second connection member comprises a plurality of connection holes through which working gas passes, and is installed in the widthwise direction of the vehicle body inside the sub-chamber.

2. The air bag cushion device of claim 1, wherein, when the sub-chamber is spread, the second connection member is installed at a preset angle with respect to the A-pillar.

3. The air bag cushion device of claim 1, wherein the connection path connects the top of the sub-chamber to the main chamber isolated from the sub-chamber in a diagonal direction.

4. The air bag cushion device of claim 1, wherein the main chamber, the sub-chamber, and the connection path are connected to form any one shape of a polygon, a circle, and an ellipse, and positioned outside the A-pillar.

5. The air bag cushion device of claim 1, wherein the main chamber, the sub-chamber, and the connection path form a closed space, and the closed space is formed in any one of a polygon, a circle, and an ellipse.

6. The air bag cushion device of claim 1, further comprising a gas discharge unit installed outside the inflator, and comprising discharge ports formed at both sides thereof so as to adjust a discharge amount of working gas generated from the inflator.

7. The air bag cushion device of claim 6, wherein the gas discharge unit comprises:
   a first discharge port configured to discharge working gas to one side of the main chamber, facing the sub-chamber; and
   a second discharge port configured to discharge the working gas to the other side of the main chamber, corresponding to the opposite side of the first discharge part.

8. The air bag cushion device of claim 7, wherein the second discharge port has a larger area than the first discharge port.

9. An air bag cushion device for protecting a pedestrian, comprising:
   an inflator mounted on a vehicle body and configured to generate a working gas;
   a main chamber configured to receive the working gas generated from the inflator and expand in a widthwise direction of the vehicle body;
   a sub-chamber connected to the main chamber, configured to receive the working gas through the main chamber, and expand to the outside of an A-pillar of the vehicle body;
   a connection path having both sides connected to the main chamber and the sub-chamber, respectively, so as to transfer the working gas between the main chamber and the sub-chamber;
   a first connection member installed in the sub-chamber facing the A-pillar, and connecting the inward-facing surface of the sub-chamber, facing the A-pillar, to the outer surface of the sub-chamber, isolated from the A-pillar;
   a second connection member installed in the sub-chamber in a direction crossing the first connection member and dividing the sub-chamber into a plurality of chambers;
   a first guide part connecting the main chamber to the vehicle body, and configured to guide the expansion of the main chamber; and
   a second guide part connecting the sub-chamber to the vehicle body, installed at a preset angle with respect to the first guide part, and configured to guide the expansion of the sub-chamber.

10. The air bag cushion device of claim 9, wherein the first guide part is connected to an inward-facing surface of the main chamber facing the vehicle body, and the second guide part is connected to an inward-facing surface of the sub-chamber facing the vehicle body.

11. The air bag cushion device of claim 9, wherein the second guide part is connected to each of the chambers formed in the sub-chamber.

12. An air bag cushion device for protecting a pedestrian, comprising:
- an inflator mounted on a vehicle body and configured to generate a working gas;
- a main chamber configured to receive the working gas generated from the inflator and expand in a widthwise direction of the vehicle body;
- a sub-chamber connected to the main chamber, configured to receive the working gas through the main chamber, and expand to the outside of an A-pillar of the vehicle body;
- a connection path having both sides connected to the main chamber and the sub-chamber, respectively, so as to transfer the working gas between the main chamber and the sub-chamber;
- a first guide part connecting the main chamber to the vehicle body, and configured to guide the expansion of the main chamber;
- a second guide part connecting the sub-chamber to the vehicle body, installed at a preset angle with respect to the first guide part, and configured to guide the expansion of the sub-chamber;
- a third guide part connecting the main chamber and the connection path and configured to guide expansion of the connection path; and
- a fourth guide part connecting opposing sides of the main chamber in a longitudinal direction so as to guide the expansion of the main chamber, and installed to cross the third guide part.

13. The air bag cushion device of claim 12, wherein the third and fourth guide parts cross each other in an X-shape.

14. The air bag cushion device of claim 13, wherein the third guide part has both sides connected to the inward-facing surface of the main chamber facing the vehicle body and the inner surface of the connection path facing a windshield glass of the vehicle, respectively, and the fourth guide part is connected to the inward-facing surface of the main chamber facing the vehicle body.

15. The air bag cushion device of claim 13, wherein the bottom of the third guide part and one side of the fourth guide part are connected to the inward-facing surface of the main chamber facing the A-pillar.

* * * * *